(12) United States Patent
Kim

(10) Patent No.: US 11,980,782 B2
(45) Date of Patent: May 14, 2024

(54) MASK HAVING INTAKE AND EXHAUST STRUCTURE

(71) Applicant: YGF INC., Incheon (KR)

(72) Inventor: Young Gu Kim, Incheon (KR)

(73) Assignee: YGF INC., Incheon (KR)

( * ) Notice: Subject to any disclaimer, the term of this patent is extended or adjusted under 35 U.S.C. 154(b) by 774 days.

(21) Appl. No.: 17/252,299

(22) PCT Filed: Nov. 15, 2018

(86) PCT No.: PCT/KR2018/013956
§ 371 (c)(1),
(2) Date: Dec. 15, 2020

(87) PCT Pub. No.: WO2020/027384
PCT Pub. Date: Feb. 6, 2020

(65) Prior Publication Data
US 2021/0260416 A1    Aug. 26, 2021

(30) Foreign Application Priority Data
Aug. 1, 2018   (KR) .................. 10-2018-0089998

(51) Int. Cl.
*A62B 9/02*   (2006.01)
*A62B 18/02*   (2006.01)
*A62B 18/08*   (2006.01)
*A62B 18/10*   (2006.01)
(Continued)

(52) U.S. Cl.
CPC ............... *A62B 23/02* (2013.01); *A62B 9/02* (2013.01)

(58) Field of Classification Search
CPC ......... A62B 23/02; A62B 23/025; A62B 9/02; A62B 18/10; A62B 7/10; A41D 13/1138; A61M 16/107; A61M 16/208
See application file for complete search history.

(56) References Cited

U.S. PATENT DOCUMENTS

| 4,981,134 A | 1/1991 | Courtney |
| 2009/0151728 A1 | 6/2009 | McConnell et al. |

(Continued)

FOREIGN PATENT DOCUMENTS

| EP | 0258508 A1 | 3/1988 |
| KR | 200446949 Y1 * | 12/2009 |

OTHER PUBLICATIONS

Machine Translation of DESCRIPTION_KR200446949Y1; Oct. 23, 2023 (Year: 2009).*

(Continued)

*Primary Examiner* — Kendra D Carter
*Assistant Examiner* — Mautin I Ashimiu
(74) *Attorney, Agent, or Firm* — Revolution IP, PLLC

(57) ABSTRACT

A filter holder for a mask, includes: an air passage, with a backflow prevention means being located in a portion thereof; a filter receptacle surrounding the air passage, accommodating a filter therein, and comprising an air inlet and an air outlet on both ends thereof, respectively; and a passage-partitioning portion spaced apart from the filter receptacle and located to face the backflow prevention means with respect to the air passage, with a distal end thereof protruding into the air outlet to cause a direction in which air purified through the filter receptacle flows to be changed.

5 Claims, 5 Drawing Sheets

(51) Int. Cl.
    *A62B 23/02*    (2006.01)
    *B01D 46/00*    (2022.01)

(56) References Cited

U.S. PATENT DOCUMENTS

2010/0199995 A1    8/2010    Howie
2015/0283410 A1    10/2015   Mueller

OTHER PUBLICATIONS

International Search Report for PCT/KR2018/013956 dated Apr. 29, 2019 from Korean Intellectual Property Office.

* cited by examiner

MASK HAVING INTAKE AND EXHAUST STRUCTURE

CROSS REFERENCE TO PRIOR APPLICATIONS

This application is the 35 U.S.C. 371 national stage of International application PCT/KR2018/013956 filed on Nov. 15, 2018; which claims priority to Korean application 10-2018-0089998 filed on Aug. 1, 2018. The entire contents of each of the above-identified applications are hereby incorporated by reference.

TECHNICAL FIELD

The present disclosure relates to a mask having an intake and exhaust structure and, more particularly, to a mask configured to remove harmful gases in an emergency disaster, thereby enabling a user to breathe.

BACKGROUND ART

The information disclosed in this section only provides background information of embodiments of the present disclosure and should not be taken as an acknowledgment or any form of suggestion that this information forms a prior art.

Golden time is a period of time following an accident during which life may be saved. The golden time may vary depending on the situation of the accident. Whether or not a life is able to be saved depends on whether or not rescuing or escaping has succeeded during the golden time.

When an accident, such as a fire, occurs in a public place, such as a subway, a department store, a large shopping mall, or a school, suffocation due to smoke or other harmful gases acts as a major cause of death.

In order to prevent such suffocation, ventilation facilities are provided in subterranean spaces or the like, but at large costs.

However, there still are problems. It is impossible to remove large amounts of harmful gases, and it is difficult to manage such facilities. In addition, a ventilation facility may not properly operate in the case of a fire, thereby causing greater casualties.

Thus, a lifesaving means able to more effectively cope with a fire is required. Recently, a portable mask has been regarded as an alternative.

A large number of portable masks must be provided in a small place in ordinary times so that a user can rapidly put on the portable mask in the case of a fire.

The structure of the mask includes a filter, a holder positioning the filter, and a mask pad attached to the face of a user.

The mask uses a plurality of types of filters. Recently, filters including a hopcalite component have come into prominence. A hopcalite material has superior ability to capture harmful gas, in particular, carbon monoxide. However, the hopcalite material loses the capturing ability thereof when coming into contact with water. Thus, in order to use the hopcalite material in the mask, a special structure able to prevent moisture, such as saliva, produced during the breathing of the user from coming into contact with the hopcalite filter must be used. However, this structure has not yet been sufficiently studied.

DISCLOSURE

Technical Problem

Accordingly, the present disclosure has been made in consideration of the above-described problems occurring in the related art, and an objective of the present disclosure is to provide a mask having a special intake and exhaust structure able to prevent moisture, such as saliva, produced during the exhalation of a user from coming into contact with a filter layer while allowing the user to smoothly inhale and exhale.

Another objective of the present disclosure is to provide a backflow preventive structure of a mask exhaust valve and a mask having the backflow preventive structure of the mask exhaust valve. The backflow preventive structure may have a simpler structure than the backflow preventive structure of an existing mask, effectively block the inflow of harmful gases, and allow the exhalation of the user to be discharged.

The objectives of the present disclosure are not limited to the aforementioned description, and other objectives not explicitly disclosed herein will be clearly understood by a person having ordinary skill in the art from the description provided hereinafter

Technical Solution

According to an aspect of the present disclosure, provided is a filter holder for a mask. The filter holder may include:

an air passage, with a backflow prevention means being located in a portion thereof;

a filter receptacle surrounding the air passage, accommodating a filter therein, and including an air inlet and an air outlet on both ends thereof, respectively; and a passage-partitioning portion spaced apart from the filter receptacle and located to face the backflow prevention means with respect to the air passage, with a distal end thereof protruding into the air outlet to cause a direction in which air purified through the filter receptacle flows to be changed.

The passage-partitioning portion and the air passage may be provided coplanar. The passage-partitioning portion and the air passage may linearly extend forward from the mouth of a user. This structure may cause air to be smoothly discharged when the user exhales, so that the user wearing the mask may feel comfortable.

The passage-partitioning portion may be configured to guide the air to longitudinally flow sequentially in a first direction in which the air enters through the filter receptacle, a second direction opposite to the first direction, and the first direction. This structure causes the configuration of the passages to be complicated, thereby preventing the air discharged during the exhalation of the user from moving toward the filter receptacle. Accordingly, even in the case that the filter made of a hopcalite material is accommodated in the filter receptacle, the hopcalite filter may be protected from moisture so as to maintain the function thereof.

In some embodiments, the backflow prevention means may include a backflow barrier, a seating portion in which the backflow barrier is seated, and a fixing pin extending through the backflow barrier to fix the backflow barrier to the seating portion.

The fixing pin may have a stepped shape, and the backflow barrier may be fixed to the seating portion due to the stepped shape. Thus, the assembly of the backflow barrier and the seating portion may be facilitated, and the backflow barrier may be elastically fixed to the seating portion.

In some embodiments, the backflow prevention means may include a backflow barrier and a seating portion in which the backflow barrier is seated. The seating portion may have a concave portion, which allows the backflow barrier to be concavely curved and in close contact therewith. This structure may reliably prevent external harmful gases from entering, since the backflow barrier is seated in and in close contact with the seating portion. The backflow barrier is more concavely curved so as to open the air passage when the user exhales so that exhaled air may be more smoothly discharged.

Advantageous Effects

An embodiment of the present disclosure as described above provides a mask including a special intake and exhaust structure preventing moisture, such as saliva, from coming into contact with a filter when a user exhales while enabling the user to smoothly inhale and exhale.

In addition, the effects of the present disclosure include a variety of effects, such as superior durability, according to embodiments. Such effects may be clearly understood from the following description of embodiments.

DESCRIPTION OF DRAWINGS

The following drawings accompanied in the specification illustrate an embodiment of the present disclosure and, together with the foregoing disclosure, serve to provide further understanding of the technical spirit of the present disclosure, and thus, the present disclosure is not construed as being limited to the drawings.

MODE FOR INVENTION

Figure 1:
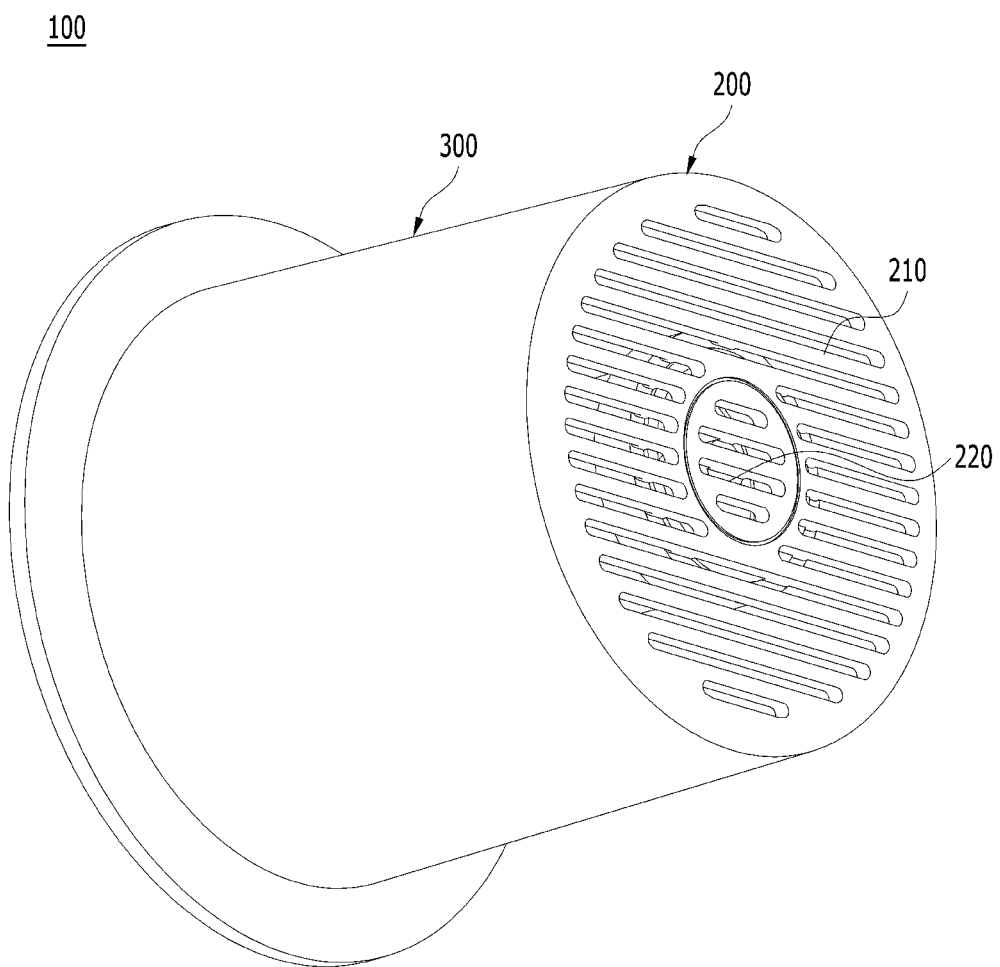
FIG. 1 is a perspective view illustrating a portable mask according to an embodiment of the present disclosure.

Hereinafter, embodiments of the present disclosure will be described in detail with reference to the illustrative drawings.

In designating elements of the drawings by reference numerals, the same elements will be designated by the same reference numerals although they are shown in different drawings. Further, in the following description of the present disclosure, a detailed description of known functions and configurations incorporated herein will be omitted in the situation in which the subject matter of the present disclosure may be rendered rather unclear thereby.

In addition, the sizes or shapes of components illustrated in the drawings may be exaggerated for the sake of clarity or convenience. Further, terms specially defined by taking the configurations and functions of the present disclosure into consideration are provided only for illustrate embodiments of the present disclosure while not being limitative.

FIG. 1 is a front perspective view illustrating a filter holder according to an embodiment of the present disclosure.

Figure 2:
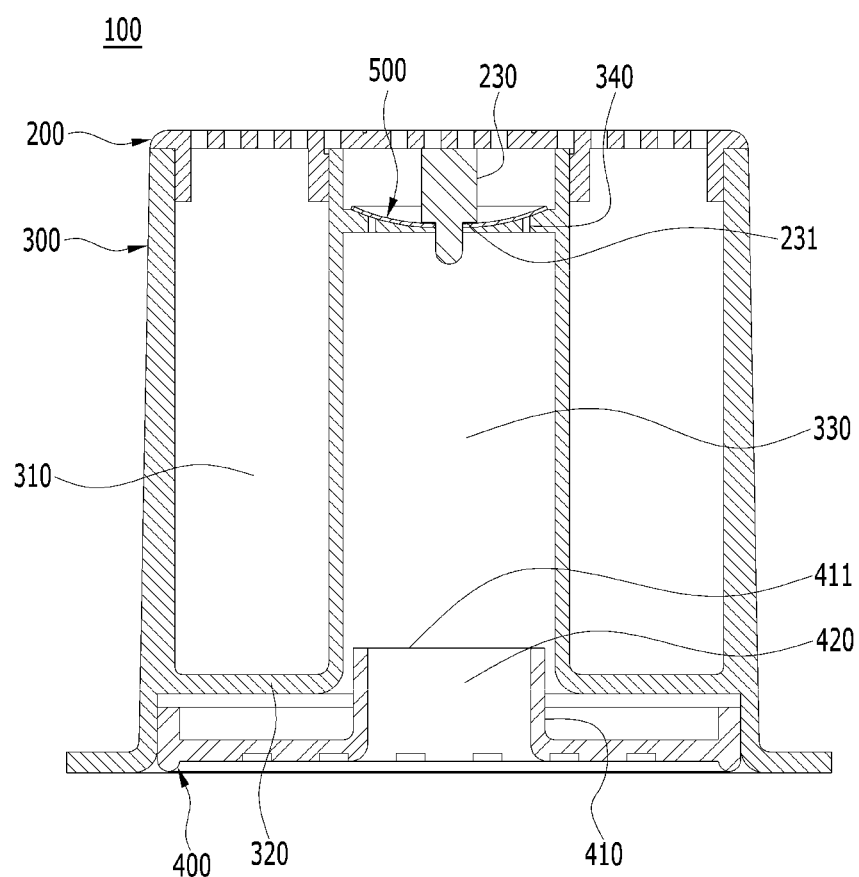
FIG. 2 is a cross-sectional view schematically illustrating the structure of the portable mask illustrated in FIG. 1.

FIG. 2 is a side sectional view schematically illustrating the structure of the filter holder illustrated in FIG. 1.

Figure 3:
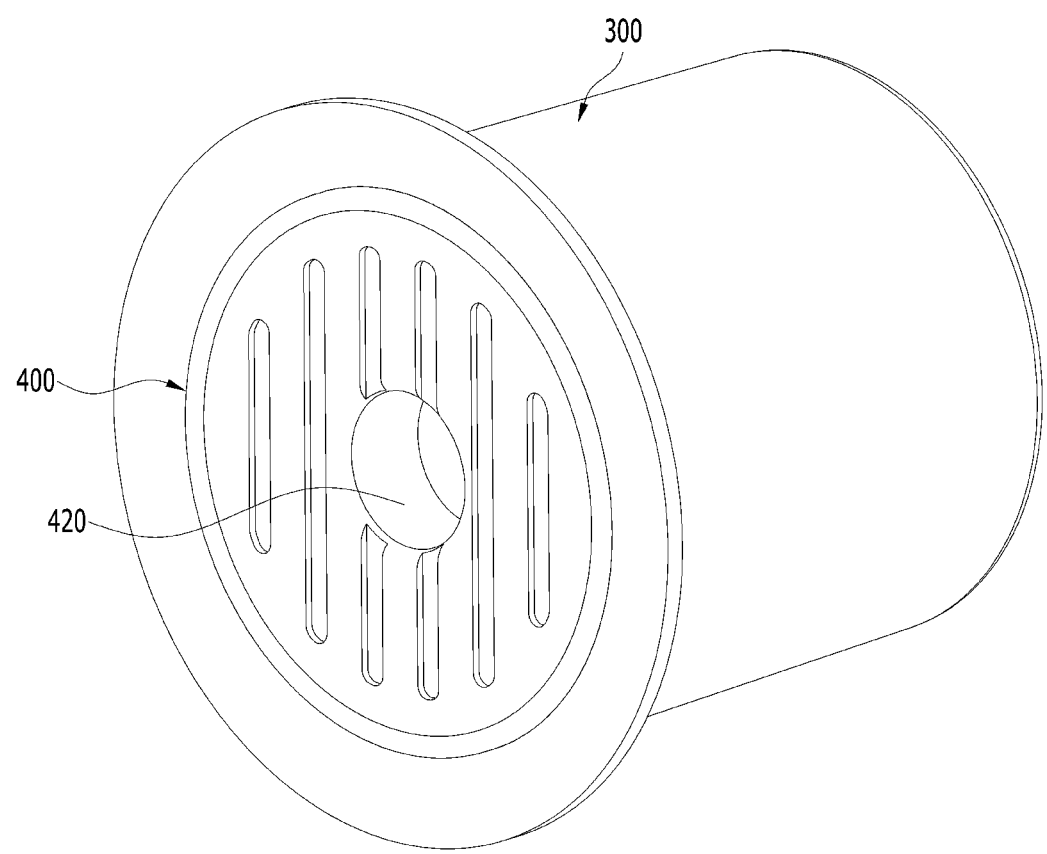
FIG. 3 illustrates a mask package according to an embodiment of the present disclosure.

FIG. 3 is a rear perspective view illustrating the filter holder illustrated in FIG. 1.

Figure 4:
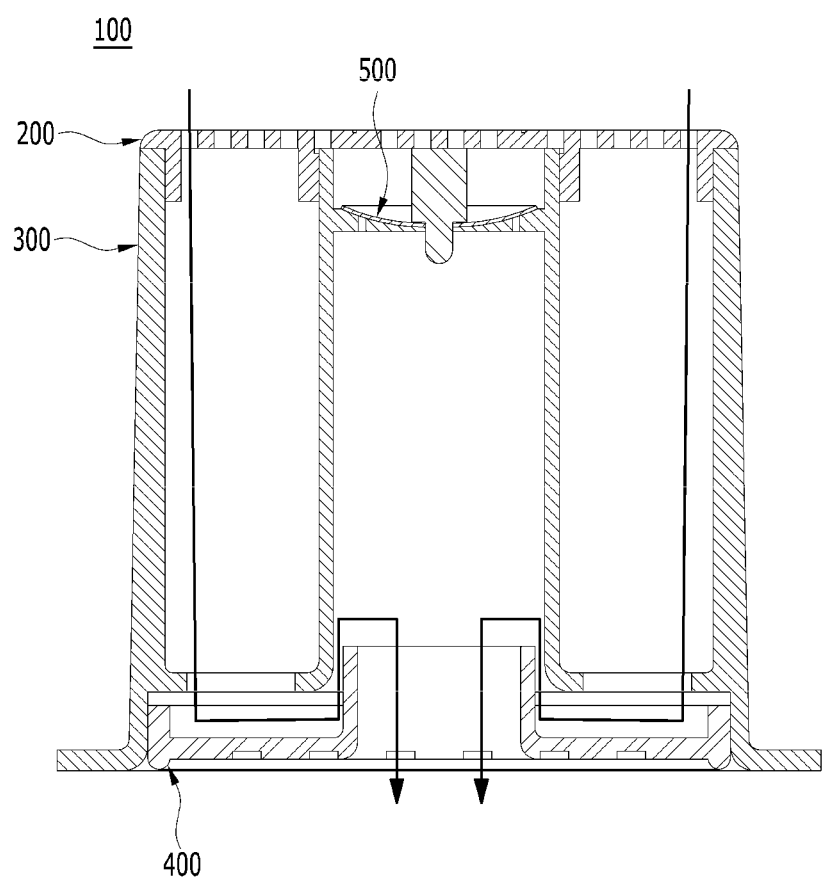
FIG. 4 illustrates a situation in which external harmful gas is filtered through a filter cartridge and then flows to the position of the mouth of a user sequentially through an air passage and a passage adjacent to the mouth when the user inhales.

FIG. 4 illustrates a situation in which external harmful gas is filtered through a filter cartridge and then flows to the position of the mouth of a user sequentially through an air passage and a passage adjacent to the mouth when the user inhales.

Figure 5:
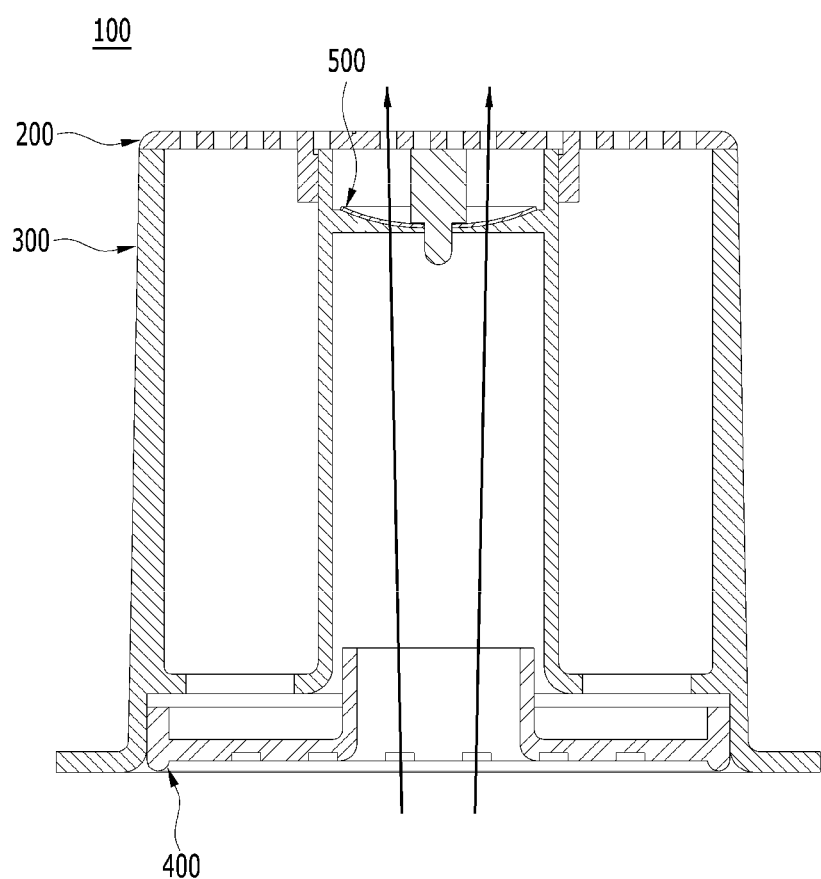
FIG. 5 illustrates a situation in which exhalation air is discharged to the outside sequentially through the passage adjacent to the mouth and the air passage when the user exhales.

FIG. 5 illustrates a situation in which exhalation air is discharged to the outside sequentially through the passage adjacent to the mouth and the air passage when the user exhales. The present disclosure will be described with reference to FIGS. 1 to 5.

A filter holder 100 according to an embodiment of the present disclosure may be used in an emergency disaster mask used in an emergency. A user may breathe using a mask having the filter holder 100 mounted thereon in a disastrous situation in which harmful gas is present.

The filter holder 100 according to an embodiment of the present disclosure may include a first holder 200, a second holder 300, and a third holder 400. The filter holder 100 according to an embodiment of the present disclosure may be assembled by coupling the first holder 200 and the third holder 400 to both ends of the second holder 300.

The first holder 200 serves as an outer cover to enclose one end of the front portion of the filter holder 100. The first holder 200 may have first through-holes 210 through which external harmful gas may enter when the user inhales to breathe and second through-holes 220 through which air may be discharged when the user exhales to breathe. In some embodiments, the first through-holes 210 may be configured to surround the second through-holes 220. The first through-holes 210 and the second through-holes 220 may be configured separately such that the first through-holes 210 are isolated from the second through-holes 220 so as not to communicate therewith.

The second holder 300 may have an air passage 330 provided in the central portion and a filter receptacle 310 surrounding the air passage 330. A backflow prevention means may be located on a side of the air passage 330. The filter receptacle 310 is not necessarily configured to surround the air passage 330. Both the structures may be configured so as to be separated from each other. Here, the filter receptacle 310 and the air passage 330 may communicate with each other through an inner through-hole 320 of the filter receptacle 310. The air passage 330 is a component through which both inhaled air and exhaled air may move. The air exhausted when the user exhales may be discharged to the outside through the air passage 330, the backflow prevention means, and the second through-holes 220. When the user inhales, external harmful gas may enter through the first through-holes 210. In this case, while the external harmful gas may enter through the second through-holes 220, the backflow prevention means disposed inside the second through-holes 220 may block the external harmful gas so that the external harmful gas cannot further enter the air passage 330. The harmful gas, having entered through the first through-holes 210 during the inhalation of the user, is removed while passing through the filter. Air purified through the filter passes through the inner through-hole 320 and passes through bent passages defined by the filter receptacle 310 and a passage-partitioning portion 410, thereby entering the air passage 330. Afterwards, the air is drawn into the mouth of the user through a mouth-adjacent passage 420 communicating with the air passage 330.

Air purified while passing through the filter in this process is sequentially guided. That is, the air is guided in a longitudinal first direction, i.e. a direction in which air enters through the filter receptacle 310, so as to flow between the outer surface of the filter receptacle 310 and the outer surface of the passage-partitioning portion 410, is redirected to a longitudinal second direction opposite to the first direction, and then is guided in the first direction so as to flow from the air passage 330 to the mouth-adjacent passage 420. That is, the air may be redirected in the sequence of the first longitudinal direction, the second longitudinal direction the second direction, and the first direction before entering the mouth of the user. When the user inhales, negative pressure is generated inside the air passage 330. Thus, the air is drawn into the mouth-adjacent passage 420 from the air passage 330 located in front of the mouth of the user, so as to be drawn into the mouth of the user.

One end of the filter receptacle 310 may have the above-described first through-holes 210, and the other end of the filter receptacle 310 may have the above-described inner through-hole 320. The external harmful gas enters through the first through-holes 210 and is removed by the filter. Afterwards, the purified air exits the filter receptacle 310 through the inner through-hole 320, flows through the bent passage defined by the filter receptacle 310 and the passage-partitioning portion 410, enters the air passage 330, and then is drawn into the mouth of the user through the mouth-adjacent passage 420.

The filter receptacle 310 may accommodate the filter, and the filter accommodated therein may be configured such that a high-efficiency particulate air (HEPA) filter, a hopcalite filter, an activated carbon filter, and the like are stacked in the direction from inside to outside. The hopcalite filter has superior performance in absorbing harmful gases, such as carbon monoxide, but is vulnerable to moisture. Thus, when moisture, such as saliva, contained in the air exhaled from the user enters the hopcalite filter, the ability of the hopcalite filter to capture harmful gases is significantly reduced. Thus, it is necessary to design the passages such that the moisture contained in the air exhaled from the user does not come into contact with the filter layer.

In the filter holder 100 according to the present embodiment, when the user exhales, the air containing moisture is discharged to the outside directly through the air passage 330 and the second through-holes 220. In contrast, when the user inhales, the backflow prevention means prevents the external harmful gas from directly entering the air passage 330, so that the purified air is introduced through the filter receptacle 310.

The third holder 400 may be coupled to the other end of the second holder 300. The third holder 400 is a component of the filter holder 100, located most adjacently to the mouth of the user. The third holder 400 has the passage-partitioning portion 410 protruding into the air passage 330. The passage-partitioning portion 410 has a section-adjacent passage formed in the central portion thereof. A distal end 411 of the passage-partitioning portion 410 protrudes into the air passage 330 to a position deeper than the position of the inner through-hole 320 of the filter receptacle 310. That is, the other end of the filter receptacle 310, in which the inner through-hole 320 is formed, and the distal end 411 of the passage-partitioning portion 410 are configured to have a height difference, even if slight, therebetween, instead of being coplanar. This structure causes the configuration of the passages to be more complicated. Thus, the complicated configuration may block the air exhaled from the user, thereby preventing the exhaled air from entering the filter receptacle 310 or coming into contact with the filter accommodated in the filter receptacle 310. Due to this structure of the passage-partitioning portion 410, the hopcalite filter or the like accommodated in the filter receptacle 310 may be isolated and protected from moisture.

The backflow prevention means disposed on the air passage 330 may include a backflow barrier 500 having the shape or a sheet, a film, or a diaphragm, a fixing pin 230 protruding inward from the position in which the second through-holes 220 of the first holder 200 are formed, and a seating portion 340 in which the fixing pin 230 is seated.

Preferably, the backflow barrier 500 is made of an elastic material, such as silicone. The backflow barrier 500 may be fixed to the seating portion 340 using the fixing pin 230. The seating portion 340 has the shape of a frame having a penetrated portion. When the user exhales, the exhaled air passes through the seating portion 340 and pushes the backflow barrier 500, so that the backflow barrier 500 is elastically bent to form a passage, through which the exhaled air exits to the outside. In contrast, when the user inhales, even when the external harmful gas enters through the second through-holes 220, the backflow barrier 500 remains seated in the seating portion 340 and is not bent anymore, so that no passage is formed, thereby preventing the harmful gas from entering the air passage 330 anymore. That is, a backflow is prevented.

The fixing pin 230 provided on the first holder 200 may extend through the backflow barrier 500 and a through-hole of the seating portion 340, thereby fixing the backflow barrier 500 to the seating portion 340. More specifically, the diameter of the fixing pin 230 decreases in a direction in which the fixing pin 230 protrudes. Thus, the fixing pin 230 has a stepped shape 231 formed in the middle portion thereof.

The stepped shape 231 of the fixing pin 230 may serve to fix the backflow barrier 500 to the seating portion 340.

In some embodiments, the seating portion may include a concave portion concaved in a direction from outside to inside. The backflow barrier 500 is in close contact with the concave portion while being concavely curved. Thus, the backflow barrier 500 may block the harmful gas during inhalation and further increase the degree of bending during exhalation, thereby allowing the exhaled air to be smoothly discharged.

Another embodiment of the present disclosure relates to a mask to which the filter holder 100 according to the foregoing embodiment is mounted. The description of the mask to which the filter holder 100 is disposed will be omitted, since the structure thereof is well known.

The above description provides an example of the technical idea of the present disclosure for illustrative purposes only. Those having ordinary knowledge in the technical field, to which the present disclosure pertains, will appreciate that various modifications and changes are possible without departing from the essential features of the present disclosure.

The embodiments disclosed in the present disclosure are intended to illustrate rather than limit the scope of the technical idea of the present disclosure, and the scope of the present disclosure is not limited by the embodiments.

The scope of the present disclosure shall be construed on the basis of the accompanying claims in such a manner that all of the technical ideas included within the scope equivalent to the claims belong to the present disclosure.

DESCRIPTION OF REFERENCE NUMERALS OF DRAWINGS

100: filter holder
200: first holder
210: first through-hole
220: second through-hole
230: fixing pin
231: stepped shape
300: second holder
310: filter receptacle
320: inner through-hole
330: air passage
340: seating portion
400: third holder
410: passage-partitioning portion
411: distal end of the passage-partitioning portion
420: mouth-adjacent passage
500: backflow barrier

The invention claimed is:

1. A filter holder for a mask, the filter holder comprising:
an air passage, with a backflow prevention means being located in a portion thereof;
a filter receptacle surrounding the air passage, accommodating a filter therein, and comprising an air inlet and an air outlet on both ends thereof, respectively; and
a passage-partitioning portion spaced apart from the filter receptacle and located to face the backflow prevention means with respect to the air passage, with a distal end thereof protruding into the air outlet to cause a direction in which air purified through the filter receptacle flows to be changed,
wherein the passage-partitioning portion is configured to guide the air to longitudinally flow sequentially in a first direction in which the air enters through the filter receptacle, a second direction opposite to the first direction, and the first direction.

2. The filter holder according to claim 1, wherein the passage-partitioning portion and the air passage are provided coplanar.

3. The filter holder according to claim 1, wherein the passage-partitioning portion and the air passage linearly extend forward from the mouth of a user.

4. The filter holder according to claim 1, wherein the backflow prevention means comprises a backflow barrier, a seating portion in which the backflow barrier is seated, and a fixing pin extending through the backflow barrier to fix the backflow barrier to the seating portion, and
the fixing pin has a stepped shape, and the backflow barrier is fixed to the seating portion due to the stepped shape.

5. The filter holder according to claim 1, wherein the backflow prevention means comprises a backflow barrier and a seating portion in which the backflow barrier is seated,
the seating portion having a concave portion, and
the concave portion allowing the backflow barrier to be concavely curved and in close contact therewith.

* * * * *